US011393142B2

(12) United States Patent
Gouda et al.

(10) Patent No.: US 11,393,142 B2
(45) Date of Patent: Jul. 19, 2022

(54) GRAPHICAL PROCESSING METHOD FOR CHARACTERISTIC DATA AND USE THEREOF

(71) Applicant: AKTIEBOLAGET SKF, Gothenburg (SE)

(72) Inventors: Kareem Gouda, Utrecht (NL); Haiyang Jackson Li, Gothenburg (SE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/167,460

(22) Filed: Feb. 4, 2021

(65) Prior Publication Data
US 2021/0248794 A1    Aug. 12, 2021

(30) Foreign Application Priority Data
Feb. 12, 2020  (CN) .......................... 202010087968.8

(51) Int. Cl.
| *G06T 11/20* | (2006.01) |
| *G06T 11/60* | (2006.01) |
| *G06T 3/40*  | (2006.01) |
| *G06T 7/00*  | (2017.01) |

(52) U.S. Cl.
CPC .............. *G06T 11/206* (2013.01); *G06T 3/40* (2013.01); *G06T 7/0004* (2013.01); *G06T 11/60* (2013.01); *G06T 2207/20081* (2013.01); *G06T 2207/20221* (2013.01); *G06T 2207/30164* (2013.01)

(58) Field of Classification Search
CPC ....... G06T 11/206; G06T 3/40; G06T 7/0004; G06T 11/60; G06T 2207/20081; G06T 2207/20221; G06T 2207/30164
See application file for complete search history.

(56) References Cited

U.S. PATENT DOCUMENTS

| 7,940,271 | B2 * | 5/2011 | Wright ................. G06T 11/206 345/440 |
| 8,560,946 | B2 * | 10/2013 | Fugitt .................. G06F 3/0481 715/700 |
| 8,737,768 | B2 * | 5/2014 | Gomi ................. G06K 9/00624 382/286 |

(Continued)

*Primary Examiner* — David T Welch
(74) *Attorney, Agent, or Firm* — J-Tek Law PLLC; Scott T. Wakeman; Mark A. Ussai

(57) ABSTRACT

A method for detecting a characteristic of a machine or component according to a time and characteristic value record includes the steps of converting a time and characteristic value record of data samples of the machine or component in a selected time window to a two-dimensional pixel bitmap in a specified pixel window, horizontal coordinates of pixel points characterizing a time sequence of data samples and vertical coordinates of pixel points characterizing quantified characteristic values of the samples, the quantified characteristic values being pixel values converted from characteristic values of individual samples using a maximum value in the window as a standard; marking the pixel bitmap according to an existing conclusion to form a sample set for training a machine learning intelligent algorithm model; and using a pixel bitmap sample in the sample set to train the algorithm model; and using the model to detect from newly collected data samples.

10 Claims, 4 Drawing Sheets split top and bottom halves of image    cut bottom half of image    stretch bottom half of image vertically    combine top and bottom halves of image

(56) References Cited

U.S. PATENT DOCUMENTS

| | | | | |
|---|---|---|---|---|
| 2005/0275898 | A1* | 12/2005 | Nguyen | H04N 1/4055 358/3.09 |
| 2008/0297512 | A1* | 12/2008 | Sanchez | G07C 5/12 345/440 |
| 2009/0245661 | A1* | 10/2009 | Ilbery | H04N 19/33 382/233 |
| 2011/0044556 | A1* | 2/2011 | Swanson | G06K 15/107 382/275 |
| 2011/0273453 | A1* | 11/2011 | Shimazawa | G06T 11/20 345/440 |
| 2012/0007868 | A1* | 1/2012 | Buck | G06Q 30/06 345/440.1 |
| 2012/0300276 | A1* | 11/2012 | Ohnishi | G02B 26/105 359/207.2 |
| 2014/0002461 | A1* | 1/2014 | Wang | G06F 1/1626 345/440 |
| 2014/0146052 | A1* | 5/2014 | Takamura | G06F 13/00 345/440 |
| 2015/0067568 | A1* | 3/2015 | Lee | G06F 3/04842 715/771 |
| 2015/0310648 | A1* | 10/2015 | Matange | G06T 11/206 345/440 |
| 2016/0012620 | A1* | 1/2016 | Kanada | G06T 11/206 345/440 |
| 2017/0011098 | A1* | 1/2017 | Tsirulnik | G06F 16/221 |
| 2021/0125053 | A1* | 4/2021 | Faibish | G06N 3/08 |
| 2021/0140928 | A1* | 5/2021 | Kumagai | G01N 29/4463 |

* cited by examiner split top and | cut bottom half | stretch bottom half of | combine top and bottom
bottom halves | of image | image vertically | halves of image
of image

GRAPHICAL PROCESSING METHOD FOR CHARACTERISTIC DATA AND USE THEREOF

CROSS-REFERENCE

This application claims priority to Chinese Patent Application No. 202010087968.8, filed on Feb. 12, 2020 the entire contents of which are fully incorporated herein by reference.

BACKGROUND OF THE INVENTION

The present invention relates to a graphical processing method for characteristic data, and a method for using image identification technology to subject a graphical data spectrum to identification and diagnosis.

Mechanical performance, quality defects and fault evolution of rotary machines or rotary components (such as electric machines, rotors, rotation shafts, gears, bearings and bearing blocks, etc.) are often all contained in outputted vibration signals thereof; consequently, detection techniques based on vibration signals have found widespread application in practice. Most existing detection applications measure whether technical characteristic values contained in signals are normal by means of threshold setting; however, in many situations, threshold setting struggles to achieve precision and reliability. This is because the characteristic values contained in signals outputted by rotary machines are often not fixed and invariable; instead, they are often closely linked to internal and external factors such as the operational state of the machine and the application operating conditions. For example, a vibration characteristic of a blower is closely related to dust accumulation on the blades; and after a bearing or main component is replaced in an electric machine, a vibration characteristic thereof will also change correspondingly. There are too many examples of this kind to enumerate.

Due to the problem mentioned above, in practice people are forced to rely on manpower for the detection and analysis of machine properties. Although human intelligence can examine the overall performance of a device from a comprehensive perspective, and thereby avoid the bias and erroneous judgements that arise when thresholds alone are relied upon, manual detection still struggles to meet practical needs in terms of accuracy and reliability, being constrained by the limitations of individual ability and experience, etc. More significant is the fact that manual detection is difficult to perform online in real time, so is unable to meet the process control needs of modern production. Reality calls for a measurement method and detection approach that are more scientific and reliable than threshold setting.

SUMMARY OF THE INVENTION

To solve the abovementioned technical problem, the present invention provides a method for converting a time and characteristic value record of a machine and/or component in a selected time window to a two-dimensional pixel bitmap in a specified pixel window. The method uses horizontal coordinates of pixel points to characterize a historical time sequence of data samples and uses vertical coordinates of pixel points to characterize quantified characteristic values of the data samples. Here, "quantified characteristic value" means a pixel value converted proportionally from characteristic values of individual samples, taking a maximum characteristic value in the selected time window as a standard. The method can convert characteristic value data in a selected time window to a pixel bitmap in a specified pixel window, and it is thereby possible to use image identification technology to subject the bitmap to detection and identification.

Based on the graphical processing method, the present invention also provides a method for detecting a relevant property of a rotary machine and/or component according to a time and characteristic value record, comprising the following steps: step 1, converting a time and characteristic value record of collected data samples of a rotary device to a two-dimensional pixel bitmap; step 2, marking the pixel bitmap according to an existing conclusion, to form a training sample set for training a machine learning intelligent algorithm model; step 3, using the training sample set to train the algorithm model; and step 4, using the trained algorithm model to subject a pixel bitmap sample converted from newly collected data samples to detection.

The detection method described above uses image identification technology to subject graphical characteristic values and variation thereof to identification and diagnosis, avoiding the subjectivity and various inconveniences of manual detection, such that the present method can be widely used for rotary device performance detection and fault analysis, and, in particular, can meet the process control needs of automated production.

BRIEF DESCRIPTION OF THE SEVERAL VIEWS OF THE DRAWING

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
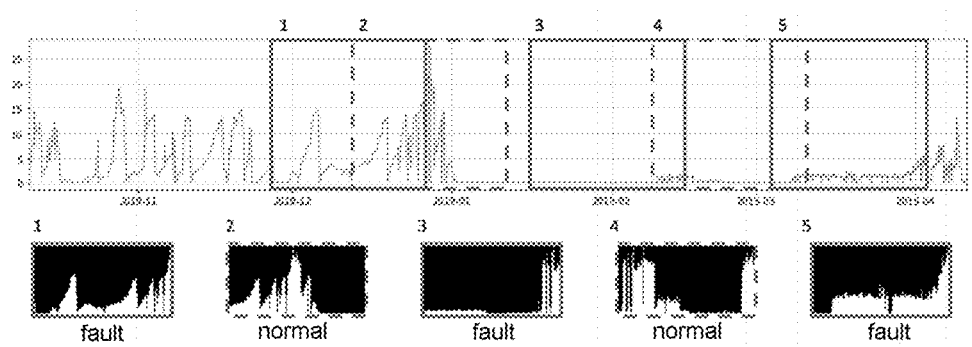
FIG. 1 is a schematic diagram of a method for converting a "time-characteristic value" record of data samples of a rotary machine and/or component in a selected time window (1-5) to a pixel bitmap in which amplitudes are distributed proportionally in a pixel window (1 5)

FIG. 1 is a schematic diagram of a method for converting a "time-characteristic value" record of data samples of a rotary machine and/or component in a selected time window to a pixel bitmap in which amplitudes are distributed proportionally in a pixel window. In the pixel windows 1-5 shown in the lower half of FIG. 1, the horizontal coordinates of the pixel points forming the image contours characterize time sequences of data samples in the time windows, and the vertical coordinates characterize quantified characteristic values, in the pixel windows, of characteristic values of the data samples. Taking as an example a pixel window having a horizontal coordinate span of 30 pixels, supposing that the horizontal coordinate of a particular pixel point therein is 15, this indicates that it is a data sample collected on the 15th day in a 30-day time window. Of course, the units of the horizontal coordinates in the pixel window are not limited to days but may also be hours or any other unit of time, as long as the characteristic evolution characterized has measurement significance in the time span. Thus, the amplitudes and variation of the pixel points forming the pattern contour reflect the sizes and evolution trend of the characteristic values in a technical sense and can serve as identification objects in image identification technology to perform detection and diagnosis.

In the selected time windows 1-5, the largest of the characteristic values of the data samples (referred to simply as the "maximum characteristic value" hereinbelow, not shown in the figures) is by default an extremum (the upper limit of absolute values) of vertical coordinates in the corresponding pixel window, and the characteristic values of the other data samples are quantified into the pixel window according to the ratio thereof to the maximum characteristic value. In other words, the maximum characteristic value is quantified as the vertical coordinate extremum of the corresponding pixel window, and the characteristic values of the other samples are quantified proportionally as different amplitudes in the pixel window. Assuming that the maximum characteristic value of all the data samples in a particular selected time window is set as the vertical coordinate extremum—128 pixels—of the corresponding pixel window, then the characteristic value of a data sample with amplitude equivalent to half of the maximum characteristic value should have a quantified characteristic value of 64 pixels in the pixel window. In other embodiments, the vertical coordinate extremum of the pixel window may also correspond to 150%, 200% or even 300% of the maximum characteristic value in the selected time window. As far as achieving the objective of the present invention is concerned, changing the abovementioned proportional correspondence will not cause a significant difference in the image identification result.

It can be seen from the above description that by establishing a correspondence between pixel points and data samples, the "time-characteristic value" record can be visualized as a pixel bitmap in a pixel window, such that the horizontal coordinates of pixel points correspond to the historical time sequence of data samples, and the vertical coordinates of pixel points correspond to the characteristic values of data samples. The visual pattern formed by the pixel points makes it possible for image identification technology to "read" the amplitudes and variation of the characteristic values. Preferably, the pixel bitmap pattern should be composed of monochrome pixel points with strong greyscale contrast, so as to further improve the technical effect of image identification. In addition, the visual processing method described above also links the maximum characteristic value to the vertical coordinate extremum of the pixel window, such that the characteristic values of all the data samples can be quantified into the same pixel window with the maximum characteristic value as a standard, thereby achieving data "mapping" from the time window into the pixel window. The visual processing method for historical data converts the "time-characteristic value" record to a pixel spectrum, not only providing an information basis for image identification, but also fundamentally eliminating the need for threshold setting and the various inconveniences arising therefrom.

It is necessary to point out that the graphical processing method is not limited to proportional quantification. When the extent of variation of characteristic values in the time window is particularly large, then logarithmic coordinates may alternatively be used for the vertical coordinates of the corresponding pixel window, thereby greatly compressing the scale of the vertical coordinates. Tests have shown that despite the differences in the distribution form of pixel points in the pixel window, different quantification methods will not give rise to significant adverse effects on the image identification result.

In the present invention, the characteristic value of a data sample is an open concept, which theoretically includes any information index capable of being used to characterize the properties of a machine in terms of performance, quality, state, etc., and can be quantified to any measurement unit capable of being acquired through human perception or technology. It may be a vibration characteristic (e.g., noise) or a non-vibration characteristic (e.g., the degree of ageing of grease); it may be a fault characteristic or a non-fault characteristic; and it may be a beneficial characteristic or a detrimental characteristic. Taking a vibration characteristic as an example, the characteristic value may be relevant data of a time domain or frequency domain signal, including speed, acceleration, energy and frequency, etc., and may also be derived data formed alone (e.g., directly measured) or formed in combination on the basis of these data (e.g., calculated from data taken), including but not limited to function values, statistical values and comparison values, etc.

Figure 2:
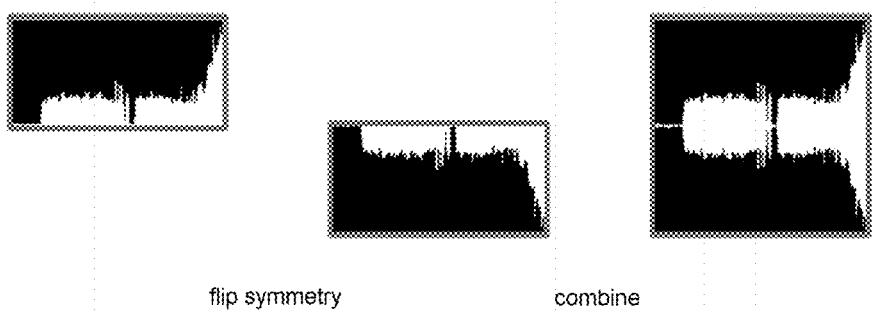
FIG. 2 is a schematic diagram of the process of converting a pixel bitmap shown in FIG. 1 to a symmetrical pixel bitmap that is symmetrical with respect to the time axis.

FIG. 2 is a schematic diagram of the process of converting a pixel bitmap shown in FIG. 1 to a symmetrical pixel bitmap that is symmetrical with respect to the time axis (i.e. the horizontal coordinates). Taking pixel window 5 in FIG. 1 as an example, the pixel image in the window is first symmetrically copied to the region below the time axis, then the two image parts above and below the time axis are combined to form one complete pixel bitmap with mirror symmetry. Symmetrical similarity helps to improve the technical effect of image identification and can improve the efficiency of training and the accuracy of identification.

Figure 3:
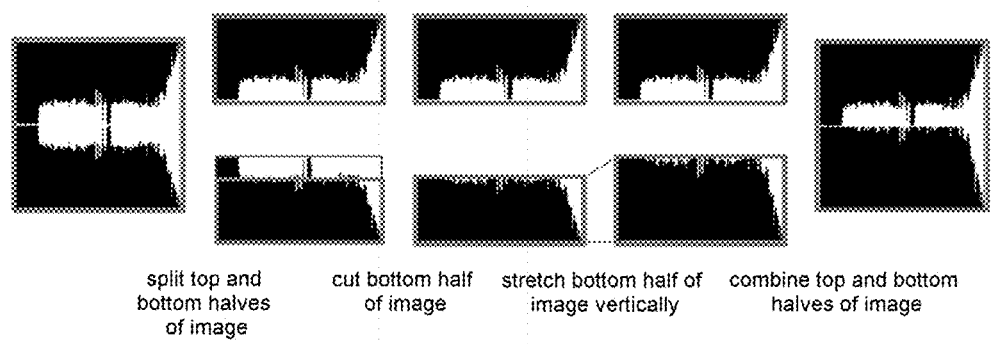
FIG. 3 is a schematic diagram of a method for converting the symmetrical pixel bitmap in FIG. 2 to an asymmetrical pixel bitmap.
Figure 4:
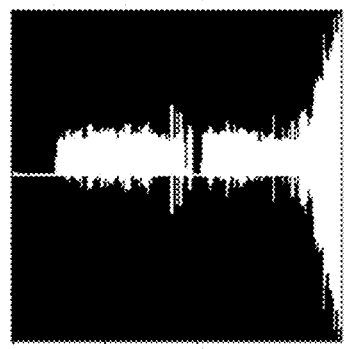
FIG. 4 is an enlarged view of the asymmetrical pixel bitmap obtained in FIG. 3.

FIG. 3 shows a schematic diagram of the process of forming an asymmetrical pixel bitmap 4 on the basis of a symmetrical pixel bitmap 2. Specifically, the asymmetrical pixel bitmap shown in FIG. 4 is formed by combining two parts of the mirror-symmetrical pixel bitmap shown in FIG. 2, one part having undergone local stretching at one side of the time axis and the other part not having undergone stretching at the other side of the time axis; the specific process is shown in FIG. 3. Here, "local stretching" refers to an image processing method in which a local pictorial surface is expanded in a specific direction (in one or two dimensions) to a larger pictorial surface range and effectively connected to a remaining image part.

In the embodiment shown in FIG. 3, the range of local stretching of the pictorial surface lies between an upper limit position $y_{up\_lim}$ and a lower limit position $y_{low\_lim}$ (not shown in the figure) in the vertical coordinate direction. In order to facilitate description, the upper limit position $y_{up\_lim}$ and lower limit position $y_{low\_lim}$ are respectively defined as the vertical coordinates of pixel points located at specific percentage positions when sorted by minimum amplitude in the pixel window. For example, the upper limit position $y_{up\_lim}$ may be the vertical coordinate of a pixel point located at the 100% position when sorted by minimum amplitude in the pixel window (i.e. a vertical coordinate extremum), and the lower limit position $y_{low\_lim}$ may be the vertical coordinate of a pixel point located at the 20% position when sorted by minimum amplitude in the pixel window ($y_{low\_lim}$=20% smallest amplitude position of sorting {all y}); then the pictorial surface range defined between the upper limit position $y_{up\_lim}$ and stretching lower limit position $y_{low\_lim}$ is the pictorial surface range of stretching.

Statistics show that when the value of the upper limit position $y_{up\_lim}$ is a vertical coordinate extremum of the pixel window and the value of the lower limit position $y_{low\_lim}$ is the vertical coordinate of a pixel point located between the 20 and 50% positions when sorted by minimum amplitude, the image identification result is better. In a preferred embodiment, when the value of $y_{low\_lim}$ is the vertical coordinate of a pixel point located within the range of the 30±5% positions when sorted by minimum amplitude, the best image identification result is achieved.

In the image processing field, pictorial surface stretching is an important method of image reconstruction, being a data expansion method based on deep learning that is adopted in response to existing problems such as the effective characteristic utilization rate of an image being inadequate. When one side of a symmetrical image is subjected to local pictorial surface stretching to form an asymmetrical image, not only is all of the information of the original image retained, but also, variation of image characteristics that image identification can easily "pay attention to" is introduced. The combination of the two distinctive features above is extremely helpful in improving the learning ability and training effectiveness of a machine learning intelligent algorithm when used for image identification. Of course, there are many other methods of image reconstruction, with no restriction to pictorial surface stretching as described above. It is not difficult to understand that any other reconstruction method could be applied effectively in the present invention, as long as it is able to introduce and/or enhance a new characteristic favourable for machine identification on the basis of a symmetrical image.

Figure 5:
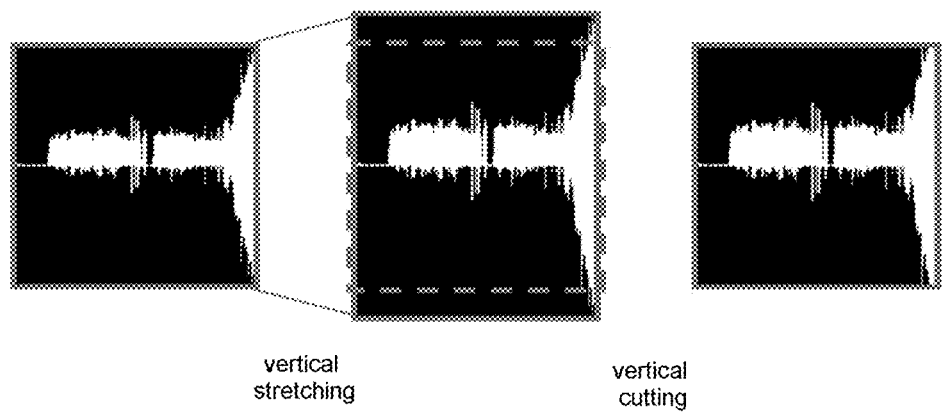
FIG. 5 shows a method of subjecting the pixel bitmap shown in FIG. 4 to image reconstruction by vertical axis stretching.
Figure 6:
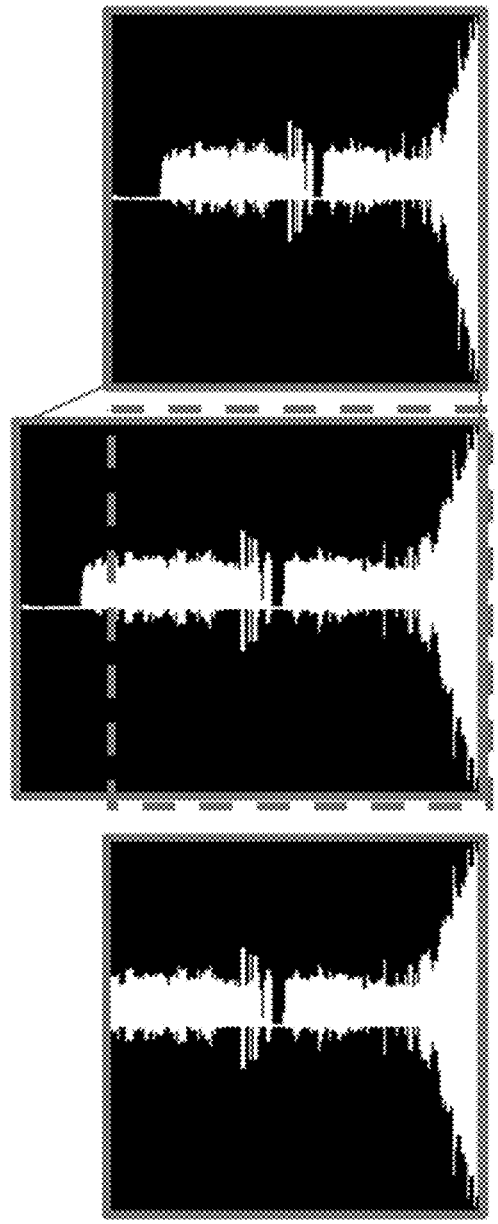
FIG. 6 shows a method of subjecting the pixel bitmap shown in FIG. 4 to image reconstruction by horizontal axis stretching.

Pictorial stretching is not limited to local pictorial stretching and may also be entire pictorial surface stretching. FIGS. 5 and 6 show vertical-axis stretching and horizontal-axis stretching image reconstruction methods respectively. In the embodiment shown in FIG. 5, the entire image is stretched in the vertical direction, i.e., the entire image is enlarged proportionally in the vertical, characteristic value axis direction, then an image part in the original pixel window is obtained by cutting. Similarly, in the embodiment shown in FIG. 6, the entire image is stretched in the horizontal direction, i.e., the entire image is enlarged proportionally in the time axis direction, then an image part in the original pixel window is obtained by cutting. In the present invention, the extent of image stretching is defined as the ratio by which the enlarged image exceeds the original image range in the stretching direction. In a preferred embodiment, the ratio of vertical axis stretching and/or horizontal axis stretching is 20%-100%.

In the present invention, entire stretching results in substantial change to the pixel characteristics contained in the image but can still be used for data expansion of a training sample set, i.e., used as an incremental data sample to expand a training sample set formed from an original data sample, for training a machine learning intelligent method model. In a typical situation, convolutional neural networks and deep learning neural networks are especially suitable for image identification and are therefore suitable for use as machine learning intelligent methods to realize the detection method of the present invention. Content relating to neural networks falls into the category of existing theory or known technology, so is not discussed in further detail herein.

The present invention is not only suitable for use in detecting, identifying and diagnosing numerous technical properties of a machine according to a (time)-(characteristic value) record, e.g. determining whether the machine has developed a fault, or whether the fault is a fault A or a fault B; it can also distinguish different degrees and stages of characteristic evolution, e.g. determine whether a characteristic B contained in a signal is a first stage characteristic B1 or a second stage characteristic B2. The implementation of the abovementioned functions mainly depends on intelligent algorithm model settings and data sample marking and classification, which are not described in further detail herein.

The diagnosis and identification method described above is suitable not only for all types of rotary machine, but also for rotary components such as rotors, bearings and gears. Those skilled in the art should understand that the method of the present invention is not restricted by particular embodiments. Any changes or improvements to the present invention which comply with the definitions in the attached claims shall be included in the scope of protection of the present invention.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A method for converting a time and characteristic value record of data samples in a selected time window to a two-dimensional pixel bitmap, the method comprising the steps of:
   using horizontal coordinates of pixel points to characterize a historical time sequence of the data samples; and
   using vertical coordinates of pixel points to characterize quantified characteristic values of the data samples, the quantified characteristic values being pixel values converted from characteristic values of individual samples, taking a maximum characteristic value in the selected time window as a standard;

wherein the pixel bitmap is reconstructed as a symmetrical bitmap with a time axis as an axis of symmetry, the symmetrical pixel bitmap being further reconstructed as an asymmetrical bitmap having certain symmetrical similarity and formed by combining two image parts of the symmetrical bitmap, one part having undergone local stretching at one side of the time axis and the other part not having undergone local stretching at the other side of the time axis.

2. The method according to claim 1, wherein a vertical coordinate extremum of the pixel bitmap corresponds to 100%-300% of the maximum characteristic value.

3. The method according to claim 1, wherein a locally stretched pictorial surface range lies between an upper limit position $y_{up\_lim}$ and a lower limit position $y_{low\_lim}$, the value of the upper limit position $y_{up\_lim}$ being a vertical coordinate extremum of the pixel bitmap, and the value of the lower limit position $y_{low\_lim}$ being a pixel value located at a position between 20% and 50% when sorted by minimum amplitude in the pixel bitmap.

4. The method according to claim 1, wherein:
a training sample set is subjected to data expansion by means of an image reconstruction method of horizontal axis stretching and/or vertical axis stretching;
wherein the horizontal axis stretching consists of proportionally enlarging the pixel bitmap in the time axis direction, then obtaining an image in an original pixel window by cutting; and
the vertical axis stretching consists of proportionally enlarging the pixel bitmap in the vertical axis direction, then obtaining an image in the original pixel window by cutting.

5. The method according to claim 4, wherein the extent of stretching of the horizontal axis stretching and/or vertical axis stretching is 20%-100%.

6. The method according to claim 1, wherein a pattern in the pixel bitmap is formed of monochrome pixel points with strong greyscale contrast.

7. A method for detecting a relevant characteristic of a rotary machine and/or component according to a time and characteristic value record, comprising the steps of:
converting a time and characteristic value record of data samples of the rotary machine and/or component in a selected time window to a two-dimensional pixel bitmap by using horizontal coordinates of pixel points to characterize a historical time sequence of the data samples and using vertical coordinates of pixel points to characterize quantified characteristic values of the data samples, the quantified characteristic values being pixel values converted from characteristic values of individual samples, taking a maximum characteristic value in the selected time window as a standard, the pixel bitmap being reconstructed as a symmetrical bitmap with a time axis as an axis of symmetry, the symmetrical pixel bitmap being further regonstrueted as an asymmetrical bitmap having certain symmetrical similarity and formed by combining two image parts of the symmetrical bitmap, one part having undergone local stretching at one side of the time axis and the other part not having undergone local stretching at the other side of the time axis;
marking the pixel bitmap according to an existing conclusion, to form a training sample set for training a machine learning intelligent algorithm model;
using a pixel bitmap sample in the training sample set to train the algorithm model; and
using the trained algorithm model to subject a pixel bitmap sample converted from newly collected data samples to detection.

8. The method according to claim 7, wherein the rotary machine and/or component is an electric machine, a bearing or a combination thereof, and the data sample is a vibration signal data sample.

9. A method for converting a time and characteristic value record of data samples in a selected time window to a two-dimensional pixel bitmap, the method comprising the steps of:
converting a historical time sequence of the data samples to horizontal coordinates of pixel points; and
converting quantified characteristic values of the data samples into vertical coordinates of pixel points, the quantified characteristic values being converted from characteristic values of individual samples while using a maximum characteristic value in the selected time window as a standard;
wherein a vertical coordinate extremum of the pixel bitmap corresponds to 100%-300% of the maximum characteristic value, the pixel bitmap is reconstructed as a symmetrical bitmap with a time axis as an axis of symmetry and further reconstructed as an asymmetrical pixel bitmap having certain symmetrical similarity and the asymmetrical pixel bitmap is formed by combining two image parts of the symmetrical pixel bitmap, one part having undergone local stretching at one side of the time axis and the other part not having undergone local stretching at the other side of the time axis.

10. A method for converting a time and characteristic value record of data samples in a selected time window to a two-dimensional pixel bitmap, the method comprising the steps of:
using horizontal coordinates of pixel points to characterize a historical time sequence of the data samples; and
using vertical coordinates of pixel points to characterize quantified characteristic values of the data samples, the quantified characteristic values being pixel values converted from characteristic values of individual samples, taking a maximum characteristic value in the selected time window as a standard;
wherein a training sample set is subjected to data expansion by means of an image reconstruction method of horizontal axis stretching and/or vertical axis stretching, the horizontal axis stretching consists of proportionally enlarging the pixel bitmap in a time axis direction, then obtaining an image in an original pixel window by cutting and the vertical axis stretching consists of proportionally enlarging the pixel bitmap in the vertical axis direction, then obtaining an image in the original pixel window by cutting.

* * * * *